United States Patent [19]

Olshansky

[11] 4,406,517
[45] Sep. 27, 1983

[54] OPTICAL WAVEGUIDE HAVING OPTIMAL INDEX PROFILE FOR MULTICOMPONENT NONLINEAR GLASS

[75] Inventor: Robert Olshansky, Corning, N.Y.

[73] Assignee: Corning Glass Works, Corning, N.Y.

[21] Appl. No.: 171,657

[22] Filed: Jul. 23, 1980

Related U.S. Application Data

[62] Division of Ser. No. 183, Jan. 2, 1979, abandoned.

[51] Int. Cl.³ .............................................. G02B 5/172
[52] U.S. Cl. .................................................. 350/96.31
[58] Field of Search ............... 350/96.29, 96.30, 96.31, 350/96.34

[56] References Cited

U.S. PATENT DOCUMENTS

| | | | |
|---|---|---|---|
| 3,826,560 | 7/1974 | Schultz | 350/96.31 |
| 3,904,268 | 9/1975 | Keck et al. | 350/96.31 |
| 4,006,962 | 2/1977 | Olshansky | 350/96.31 |
| 4,057,320 | 11/1977 | Marcatili | 350/96.31 |
| 4,158,479 | 6/1979 | Geckeler | 350/96.31 |
| 4,179,188 | 12/1979 | Geckeler | 350/96.31 |
| 4,204,745 | 5/1980 | Sakai et al. | 350/96.31 |
| 4,222,631 | 9/1980 | Olshansky | 350/96.31 |

OTHER PUBLICATIONS

Gloge et al., "Multimode Theory of Graded-Core Fibers", Bell Syst. Tech. Journal, vol. 52, No. 9, Nov. 1973, pp. 1563-1578.
Ostermayer, Jr. et al., "Optimum Refractive-Index Difference For . . .", Bell Syst. Tech. J., vol. 53, No. 7, Sep. 1974, pp. 1395-1402.

Primary Examiner—John D. Lee
Attorney, Agent, or Firm—W. S. Zebrowski; R. E. Kurtz

[57] ABSTRACT

A gradient index optical waveguide has an optimal index profile even though the relationship between concentration and refractive index is not linear. This is accomplished by varying the concentrations of the dopants as a function of the radial distance from the center of said core substantially as:

$$C_i(r) = C_i^0 + [(1-\xi_i)(r/a)^\alpha + \xi_i(r/a)^{2\alpha}]C_i^1$$

where $C_i(r)$ denotes the concentration of the $i^{th}$ dopant as a function of radial distance r, $C_i^0$ denotes the concentration at r=o of the $i^{th}$ dopant, $C_i^1$ is the total change in concentration of dopants between r=o and r=a, $\alpha$ is the selected index profile, and $\xi_i$ are variable parameters relating the concentration of the $i^{th}$ dopant to radial distance r.

5 Claims, 3 Drawing Figures

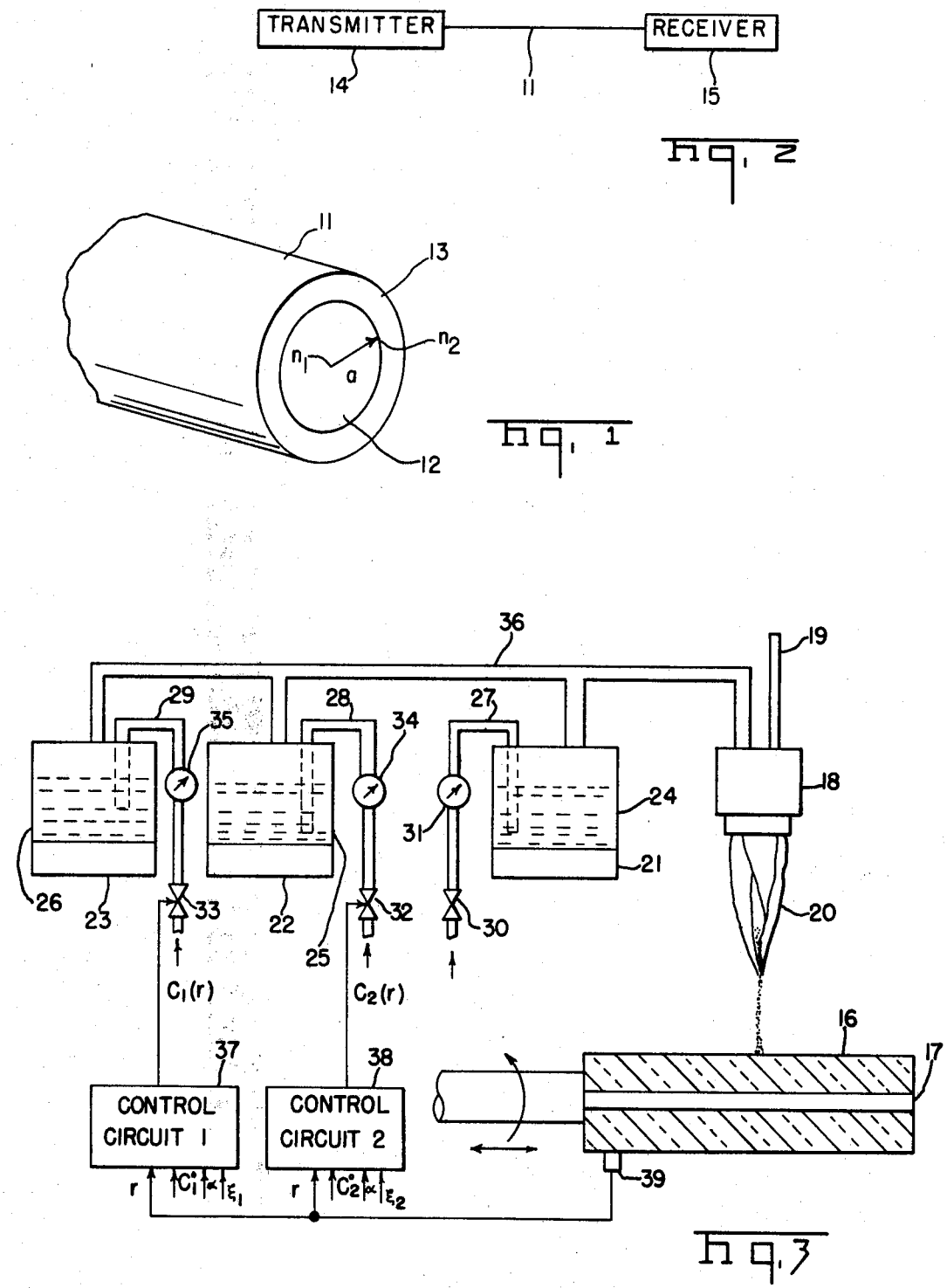

OPTICAL WAVEGUIDE HAVING OPTIMAL INDEX PROFILE FOR MULTICOMPONENT NONLINEAR GLASS

This application is a division of application Ser. No. 183, filed Jan. 2, 1979 (now abandoned).

BACKGROUND OF THE INVENTION

This invention relates to a gradient index optical waveguide having an optical refractive index profile.

The propagation of light waves in optical waveguides is governed by laws of physics similar to those that govern microwave propagation and therefore can be studied in terms of modes, each of which has its own propagation and electromagnetic field characteristics. Single mode waveguides are advantageous in that they are capable of propagating optical signals with very low dispersion, but due to the low numerical aperture and/or small core size of such fibers, it is difficult to efficiently inject optical signals into these waveguides. Multimode waveguides have larger core diameters and/or larger numerical apertures than single mode waveguides. Multimode waveguides are therefore often the preferred medium for the transmission of optical signals since they can accept light from incoherent, broad spectral width sources such as light emitting diodes. However, thousands of modes propagate in multimode optical waveguides, each mode traveling at a slightly different group velocity. A short input pulse that is shared by many guided modes thus splits up into a sequence of pulses that arrive at the output end of the waveguide at different times. This type of pulse dispersion is the dominant cause of dispersion in typical multimode optical waveguides.

Optical waveguides initially consisted of a core of uniform refractive index surrounded by a layer of cladding material having a lower refractive index. In this type of prior art fiber the time required for the various modes to travel a given longitudinal distance along the waveguide increases as the mode order increases. The delay distortion in such a fiber, defined as the difference in the times it takes the fastest mode and the slowest mode to traverse a given longitudinal length, is very large. It has been recently recognized that optical waveguides, the cores of which have radially graded index profiles, exhibit significantly reduced pulse dispersion resulting from group velocity differences among modes. This dispersion reducing effect, which is discussed in the publication by D. Gloge et al, entitled "Multimode Theory of Graded-Core Fibers," published in the November 1973 issue of the Bell System Technical Journal, pp. 1563-1578, employs a radially graded, continuous index profile from a maximum value at the center of the core to a lower value at the core-cladding interface. The index distribution in this type of waveguide is given by the equation:

$$n(r) = n_1[1 - 2\Delta(r/a)^\alpha]^{\frac{1}{2}} \text{ for } r \leq a \tag{1}$$

where $n_1$ is the refractive index at the center of the core, $n_2$ is the refractive index of the fiber core at radius a, $\Delta = (n_1^2 - n_2^2)/2n_1^2$ and a is the core radius.

Initially it was thought that a parabolic gradient wherein $\alpha = 2$ was optimal. Recently variations from an $\alpha = 2$ gradient have proven useful. U.S. Pat. No. 3,904,268—Keck and Olshansky describes a particularly desirable value of $\alpha$ which reduces the dispersive properties of the core and cladding.

For some glass compositions, the refractive index squared is linearly proportional to the dopant concentrations. That is, the square of the index of refraction at the center of the core is equal to the square of the index of refraction at the radius a plus a term which is linearly related to the concentration of the dopants. This can be expressed as:

$$n_1^2 = n_2^2 \left[ 1 + \sum_{i=1}^{N} P_i C_i \right] \tag{2}$$

where N is the number of dopants, $C_i$ is the concentration of the $i^{th}$ dopant glass and the $P_i$ are $\lambda$-dependent proportionality factors. In such a case, the refractive index profile given by Eq. (2) can be fabricated by varying the dopants as:

$$C_i(r) = C_i^\circ + C_i^1(r/a)^2 \tag{3}$$

However, often there is not a linear relationship between refractive index squared and dopant concentration. Multicomponent glass forming compounds which have been recently used in the fabrication of optical waveguides quite often do not have the linear relationship between concentration and refractive index squared.

The present invention provides a method of producing the desired gradient index profile from multicomponent glasses of any specified composition.

SUMMARY OF THE INVENTION

In accordance with this invention, variable parameters relate the concentrations of the dopants and the radius of the waveguide. This results in a waveguide having the desired power law profile. More particularly, the concentrations of the dopants vary as a function of the radial distance from the center of said core substantially as:

$$C_i(r) = C_i^\circ + [(1-\xi_i)(r/a)^\alpha + \xi_i(r/a)^{2\alpha}]C_i^1 \tag{4}$$

where $C_i(r)$ denotes the concentration of the $i^{th}$ dopant as a function of radial distance, $C_i^\circ$ denotes the concentration at $r=0$ of the $i^{th}$ dopant, $C_i^1$ denotes the difference in concentration of the $i^{th}$ dopant between $r=a$ and $r=0$, $\alpha$ is the selected index profile, and $\xi_i$ are variable parameters relating the concentration of the $i^{th}$ dopant to radial distance r. I have found that when concentrations are varied in this manner, the index of refraction of the glass waveguide as a function of radial distance is approximately given by:

$$n^2(r) = n_1^2[1 - 2\Delta(r/a)^\alpha] + \delta(\lambda)(r/a)^{2\alpha}, \tag{5}$$

and the correction factor $\delta(\lambda)$ can be made equal to zero at the operating wavelength $\lambda_s$.

It can be seen that the index of refraction profile differs from the index of refraction profile produced where there is a linear relationship with concentration by the correction fraction $\delta(\lambda) (r/a)^{2\alpha}$. By proper choice of the variable parameters $\xi_i$, this correction factor and its derivatives with respect to wavelength can be made equal to zero. By such selection of the parameters $\xi_i$, the index of refraction follows the desired power law given by equation (1) even though there is not a linear relationship between concentration and index of refraction squared.

The foregoing and other objects, features and advantages of the invention will be better understood from the following more detailed description and appended claims.

DESCRIPTION OF THE DRAWINGS

FIG. 1 shows a segment of the waveguide of this invention;

FIG. 2 depicts its use in an optical communications system; and

FIG. 3 depicts a method of fabricating the waveguide.

DESCRIPTION OF THE PREFERRED EMBODIMENT

A waveguide 11 has a core 12 and a cladding 13. The index of refraction of the cladding 13 is less than that of the core 12. The core 12 has a gradient index of refraction which varies from $n_1$ at the center of the core to $n_2$ at the radius a.

This waveguide is coupled into an optical communication system depicted in FIG. 2 wherein a transmitter 14 includes a light source having a mean wavelength $\lambda_s$. A receiver 15 at the output end of the waveguide receives light from the waveguide 11 and responds to this light.

In accordance with this invention, the core 12 is made from multicomponent glass, such as fused quartz doped with germania and phosphorous. The concentration of each of these dopants varies radially.

It is desired that the core have an index of refraction profile given by:

$$n^2(r) = n_1^2[1 - 2\Delta(r/a)^\alpha] \quad r \leq a \tag{6}$$

In accordance with the aforementioned Keck and Olshansky patent, the information bandwidth of the waveguide is maximized if the value of $\alpha$ is $$\alpha = 2 - \frac{2n_1}{N_1} \frac{\lambda}{\Delta} \frac{d\Delta}{d\lambda} - \frac{12}{5}\Delta$$

at the operating wavelength $\lambda_s$.

A waveguide having the profile given by Equation (6) is said to follow a power law. Such a waveguide can be produced in accordance with the present invention by varying the concentrations of the dopants in a particular manner during the fabrication of the waveguide.

FIG. 3 depicts apparatus for fabricating waveguides. This apparatus forms no part of the present invention, but the apparatus will be described first so that the manner in which the present invention is used to operate this apparatus can be better understood.

A layer 16 of glass is applied to a substantially cylindrical glass starting member or bait rod 17 by means of outside vapor phase oxidation burner 18. Fuel gas and oxygen or air are supplied to burner 18 from a source not shown by a suitable means such as pipe 19. This mixture is burned to produce flame 20 which is emitted from the burner.

Containers 21, 22 and 23 hold quantities of liquid or gas constituents 24, 25 and 26 respectively which will ultimately form layer 16. A suitable gaseous medium, such as oxygen or the like, is supplied to the containers and bubbled through the liquids by means of tubes 27, 28 and 29. The gaseous medium or carrier gas is supplied from a suitable source, not shown, in predetermined quantities and at predetermined pressures. The flow of carrier gas which is bubbled through liquid constituent 24 in container 21 is regulated by valve 30, the flow rate of this carrier gas being indicated by gauge 31. Similarly, the flows of carrier gas bubbled through liquid constituents 25 and 26 in containers 22 and 23 are regulated by valves 32 and 33 with the flow rates of these gases being indicated by gauges 34 and 35.

The liquid constituents in the containers are maintained at the desired temperatures by heaters. As the carrier gas is bubbled through the heated liquid constituents, vapors of this liquid become entrained in the carrier gas and are exhausted by means of tube or pipe 36. The carrier gas vapor mixture is fed to outside vapor phase oxidation burner 18 and is injected into flame 20 wherein the gas vapor mixture is oxidized to form a glass soot. The soot leaves flame 20 in a stream which is directed toward starting member 17. Starting member 17 is both rotated and translated as indicated by the arrows adjacent the supporting end of the starting member so that a uniform deposition of soot is applied to the starting member.

Containers 21–23 contain a glass forming compound and at least two dopants. As an example, container 21 contains $SiCl_4$, container 25 contains $GeCl_4$ and container 26 contains $BCl_3$.

The valve 30 is controlled in the manner described in the Schultz U.S. Pat. No. 3,826,560 to produce the gradient index of refraction. Valves 32 and 33 are controlled in accordance with this invention to vary the dopant concentration in the desired manner.

In accordance with the invention, control circuits 37 and 38 control the concentrations of the two dopants while the waveguide is being formed. A sensor 39 produces an electrical output representing the radius of the waveguide as it is being formed. This signal is applied to each of the control circuits 37 and 38. Also, electrical signals representing the concentrations of the two dopants at the center of the core are generated, these signals for the two dopants being denoted $C_1^*$ and $C_2^*$. Electrical signals representing the variable parameters $\xi_1$ and $\xi_2$ are generated and applied to control circuits 37 and 38 respectively. An electrical signal representing the selected value of $\alpha$ is generated and applied to each control circuit. The values of $C_1^*$, $C_2^*$, $C_1^1$, $C_2^1$, $\xi_1$, $\xi_2$ and $\alpha$ are all selected to produce the desired optimal index profile.

The selected value of $\alpha$ can be 2; it can be $2-2\Delta$; it can be selected in accordance with the aforementioned Keck and Olshansky patent; or it can be any other selected value.

Control circuit 37 produces an output signal $C_1(r)$ which varies in accordance with:

$$C_1(r) = C_1^* + [(1-\xi_1)(r/a)^\alpha + \xi_1(r/a)^{2\alpha}]C_1^1 \tag{7}$$

Control circuit 38 produces a signal $C_2(r)$ which varies in accordance with:

$$C_2(r) = C_2^* + [(1-\xi_2)(r/a)^\alpha + \xi_2(r/a)^{2\alpha}]C_2^1 \tag{8}$$

Analog circuits which produce such control signals are well known. For example, "ANALOG COMPUTATION IN ENGINEERING DESIGN," Rogers and Connolly, McGraw-Hill Book Company, Inc., 1960, describes such circuits. However, in the preferred embodiment of the invention, a digital microprocessor chip is used to generate the control signals. One example of a microprocessor chip which is suitable for this purpose is the Program Logic Controller, manufactured by Allen-Bradley Company.

Control signals $C_1(r)$ and $C_2(r)$ control the valves 33 and 32 respectively so that the dopants vary in the prescribed manner.

EXAMPLE

A multimode optical waveguide consists of a fused silica core doped with $GeO_2$ and $B_2O_3$ so that at r=o there is 10. mole percent $GeO_2$ and 0.0 mole percent $B_2O_3$ and at $r \geq a$ there is 0.0 mole percent $GeO_2$ and 10. mole percent $B_2O_3$; that is, $$C_1^o = 10. \quad C_1^1 = -10$$
$$C_2^o = 0. \quad C_2^1 = 10,$$

where subscript 1 refers to $GeO_2$ and subscript 2 to $B_2O_3$. Refractive index data for $GeO_2$ doped silica can be found in the papers by J. W. Fleming in J. Amer. Ceram. Soc., 59, 503–507, (1976) abd by S. Kobayashi et al in the Technical Digest of International Conference on Integrated Optics and Optical Fiber Communication, Tokyo, 3029, (1977). Refractive index data for $B_2O_3$ doped silica can be found in the paper by H. M. Presby and I. P. Kaminow, Applied Optics 15, 302–9, (1976). Refractive index for fused silica can be found in the paper by I. H. Malitson, J. Amer. Opt. Soc. 55, 1205, (1965).

If $\lambda_s$ is chosen to be 0.85 μm, the above-mentioned refractive index data can be used to determine the following values for $P_i$, $P_{ij}$, $\lambda dP_i/d\lambda$ and $\lambda dP_{ij}/d\lambda$:

$$P_1 = .00455 \quad \lambda dP_1/d\lambda = -.00023$$
$$P_2 = -.00211 \quad \lambda dP_2/d\lambda = -.00041$$
$$P_{22} = .00005 \quad \lambda dP_{22}/d\lambda = 0.$$
$$P_{11} = 0. \quad \lambda dP_{11}/d\lambda = 0.$$
$$P_{12} = 0. \quad \lambda dP_{12}/d\lambda = 0.$$

where all quantities are evaluated at 0.85 μm. Since $n_0$ is 1.4525, these values give.

$$n_1 = 1.46808$$
$$n_2 = 1.44695$$
$$\Delta = .01429.$$

The $\alpha$ value which maximizes the information bandwidth is 1.870.

From Eq. (14) and the preceding values of $P_i$, $P_{ij}$ and their derivatives, $\delta(\lambda_s)$ is found to be $$\delta(\lambda_s) = .005 - .0455 \xi_1 - .0211 \xi_2$$

$$\lambda d\delta/d\lambda \Big|_{\lambda = \lambda_s} = +.0023 \xi_1 - .0041 \xi_2 = o$$

This gives the solution $$\xi_1 = +.087 \quad \xi_2 = +.049.$$

A waveguide fabricated according to these specifications will have the optimal power law profile in the spectral region surrounding $\lambda_s$.

THEORY

This invention relates to the general case in which the linear relationship expressed by Equation (2) is not valid. The refractive index squared can be written in a general Taylor series in the concentrations:

$$n_1^2 = n_0^2 + \sum_{i=1}^{N} P_i C_i + \sum_{i,j=1}^{N} P_{ij} C_i C_j + \text{higher order terms,} \quad (9)$$

where $n_0$ is the index of fused silica. In this case, one cannot always fabricate an index profile which has the power law form over a wide range of wavelengths. This invention produces the best profile shape which can be obtained under these circumstances.

For simplicity it will be assumed that the higher order terms in Equation (9) can be neglected. If this is not the case, the invention can be extended in a straight-forward manner.

Let the dopant concentration be given as:

$$C_i(r) = C_i^\circ + [(1-\xi_i)(r/a)^\alpha + \xi_i(r/a)^{2\alpha}]C_i^1, \quad (10)$$

where the $\xi_i$ are variable parameters which shall be chosen to maximize the fiber bandwidth. Substituting Equation (10) into Equation (9) gives.

$$n^2(r) = n_1^2[1 - 2\Delta(r/a)^\alpha] + \xi(\lambda)(r/a)^{2\alpha} \quad (11)$$

where $$n_1^2 = n_0^2 + \Sigma P_i C_i^\circ + \Sigma\Sigma P_{ij} C_i^\circ C_j^\circ \quad (12)$$

$$\Delta = -\frac{\Sigma P_i C_i^1(1 - \xi_i) + 2\Sigma\Sigma P_{ij} C_i^\circ C_j^1}{2[n_0^2 + \Sigma P_i C_i^\circ + \Sigma\Sigma P_{ij} C_i^\circ C_j^\circ]} \quad (13)$$

and $$\delta(\lambda) = [+\Sigma P_i C_i^1 \xi_i + \Sigma P_{ij} C_i^1 C_j^1] \quad (14)$$

In these equations the $\xi_i$ are small parameters of order $C_i$, so that terms of $O(C^2 \xi)$ have been neglected.

The index profile of Equation (11) can be reduced to the power law form if $$\delta(\lambda_s) = 0 \quad (15)$$

as a result of proper choice of the $\xi_i$. For N dopants, there are N parameters $\xi_i$. It is thus possible to further specify the profile by requiring some of the derivatives of $\delta(\lambda)$, evaluated at $\lambda_s$, to be zero, $$\frac{d^k \delta}{d\lambda^k}\bigg|_{\lambda = \lambda_s} = 0. \quad k = 1 \ldots \leq N - 1 \quad (16)$$

In accordance with this invention, an optimal graded-index optical waveguide is fabricated from $n \geq 2$ dopants and has an index profile, $$n^2(r) = n_1^2[1 - 2\Delta(r/a)^\alpha] + \delta(\lambda)(r/a)^{2\alpha}$$

where conditions (15) and (16) have been imposed by choosing the $\xi_i$ appropriately.

From the foregoing, the determination of $\xi_i$ for other compositions will be apparent.

FIG. 3 depicts fabrication of waveguides wherein there are two dopants. However, it will be understood that the present invention is applicable to cases where there are more dopants.

While particular embodiments of the invention have been shown and described, various modifications are within the true spirit and scope of the invention. The appended claims are intended to cover all such modifications.

What is claimed is:

1. A gradient index optical waveguide comprising:
   a core having a radius a formed from silicate compounds with at least two dopants;
   the refractive index of said core being $n_1$ at the radius $r=0$ and $n_2$ at the radius $r=a$, the concentrations of each compound being a function of the radial distance from the center of the core substantially as:

$$C_i(r) = C_i^{\circ} + [(1-\xi_i)(r/a)^{\alpha} + \xi_i(r/a)^{2\alpha}]C_i^1,$$

where $C_i(r)$ denotes the concentration of the $i^{th}$ dopant as a function of radial distance, $C_i^{\circ}$ denotes the concentration at $r=0$ of the $i^{th}$ dopant, $C_i^1$ denotes the difference in concentration of the $i^{th}$ dopant between $r=a$ and $r=0$, $\alpha$ is the selected index profile, $\xi_i$ are variable parameters relating the concentration of the $i^{th}$ dopant to radial distance r, said parameters minimizing the factor $\delta(\lambda)$ by which the index of refraction profile differs from the profile produced where there is a linear relationship between index of refraction and said concentrations.

2. The optical waveguide recited in claim 1 wherein said variable parameters $\xi_i$ are such that $\delta(\lambda)$ is zero, where $\delta(\lambda)$ is:

$$[+\Sigma P_i C_i^1 \xi_i + \Sigma P_{ij} C_i^1 C_j^1] = 0,$$

where $P_{ij}$ are proportionality factors dependent upon the wavelength of the light with which said waveguide is used and i and j designate dopants.

3. The waveguide recited in claim 2 wherein said variable parameters $\xi_i$ are such that the derivatives with respect to said wavelength of $\delta(\lambda)$ are zero, i.e.:

$$\frac{d^k \delta(\lambda)}{d\lambda^k} = \frac{d^k}{d\lambda^k}[+\Sigma P_i C_i^1 \xi_i + \Sigma P_{ij} C_i^1 C_j^1] = 0$$
   $$\lambda = \lambda_s$$

where $\lambda_s$ is the wavelength of said light and k is less than or equal to the number of dopants present in the core.

4. The optical waveguide recited in claim 1 wherein said optical waveguide has a radial index of refraction n(r) given by:

$$n^2(r) = n_1^2[1 - 2\Delta(r/a)^{\alpha}] + \delta(\lambda)(r/a)^{2\alpha}$$
   where
   $$n_1^2 = n_0^2 + \Sigma P_i C_i^p + \Sigma\Sigma P_{ij} C_i^p C_j^p,$$

$$\Delta = -\frac{\Sigma P_i C_i^1 (1-\xi_i) + 2\Sigma\Sigma P_{ij} C_i^p C_j^1}{2[n_0^2 + \Sigma P_i C_i^p + \Sigma\Sigma P_{ij} C_i^p C_j^p]}$$

and where $\delta(\lambda)$ is equal to zero.

5. An optical waveguide having a gradient index profile formed from multicomponent glasses of a specified composition comprising:
   a core formed from silicate compounds with at least two dopants:
   the concentrations of said compounds in said core producing said specified composition; and
   the concentrations of said compounds in said core being varied in relation to parameters which relate the concentration of the dopants to radial distance from the center of the core in accordance with:

$$C_i(r) = C_i^{\circ} + [(1-\xi_i)(r/a)^{\alpha} + \xi_i(r/a)^{2\alpha}]C_i^1,$$

where $C_i(r)$ denotes the concentration of the $i^{th}$ dopant as a function of radial distance, $C_i^p$ denotes the concentration at $r=0$ of the $i^{th}$ dopant, $C_i^1$ denotes the difference in concentration of the $i^{th}$ dopant between $r=a$ and $r=0$, $\alpha$ is the selected index profile, and wherein $\xi_i$ are variable parameters relating the concentration of $i^{th}$ dopant to radial distance r, said parameters minimizing the factor $\delta(\lambda)$ by which the index of refraction profile differs from the profile produced where there is a linear relationship between index of refraction and said concentrations.

* * * * *

UNITED STATES PATENT AND TRADEMARK OFFICE
CERTIFICATE OF CORRECTION

PATENT NO. : 4,406,517

DATED : September 27, 1983

INVENTOR(S) : Robert Olshansky

It is certified that error appears in the above—identified patent and that said Letters Patent is hereby corrected as shown below:

Column 1, line 60, "$2\Delta(r/a)^{60}$," should be --$2\Delta(r/a)^{\alpha}$--.

Column 4, line 58, "$(r/a)^{\Delta}$", should be --$(r/a)^{\alpha}$--.

Column 5, line 12, "$r \geq a$there", should be --$r \geq a$ there--.

Column 6, line 25, "$(r/a)^{\alpha}] + \xi$, should be --$(r/a)^{\alpha}] + \delta$--.

Signed and Sealed this

Seventeenth Day of January 1984

[SEAL]

Attest:

GERALD J. MOSSINGHOFF

Attesting Officer

Commissioner of Patents and Trademarks